United States Patent [19]
Swartz

[11] Patent Number: 6,066,585
[45] Date of Patent: May 23, 2000

[54] CERAMICS HAVING NEGATIVE COEFFICIENT OF THERMAL EXPANSION, METHOD OF MAKING SUCH CERAMICS, AND PARTS MADE FROM SUCH CERAMICS

[75] Inventor: Scott L. Swartz, Worthington, Ohio

[73] Assignee: Emerson Electric Co., St. Louis, Mo.

[21] Appl. No.: 09/080,870

[22] Filed: May 18, 1998

[51] Int. Cl.⁷ .................................................. C04B 35/19
[52] U.S. Cl. ............................ 501/128; 133/153; 133/154
[58] Field of Search ...................................... 501/128, 133, 501/153, 154, 7

[56] References Cited

U.S. PATENT DOCUMENTS

| | | |
|---|---|---|
| 3,647,489 | 3/1972 | McMillan et al. |
| 3,754,947 | 8/1973 | Burkert et al. ........................... 501/153 |
| 5,320,792 | 6/1994 | Wu et al. ...................................... 501/3 |
| 5,545,427 | 8/1996 | Boilot et al. ................................. 501/7 |

OTHER PUBLICATIONS

Biefeld et al., Effects Of Composition Changes, Substitutions, And Hydrostatic Pressure On The Ionic Conductivity In Lithium Aluminosilicate And Related Beta–Eucryptite Materials, *J. Electrochem. Soc.: Electrochemical Science And Technology,* 125(2):179–185 (1978) (No month).

Buchanan et al., Properties Of Hot–Pressed Zirconium Pyrovanadate Ceramics, *J. Electrochem. Soc: Solid–State And Technology,* 130(9):1905–1910 (1983) (No month).

Bush et al., High–Temperature Mechanical Properties Of Ceramic Materials: II, Beta–Eucryptite, *Journal Of The American Ceramic Society,* 42(8):388–391 (1959) (No month).

Chu et al., Negative Thermal Expansion Ceramics: A Review, *Materials Science And Engineering,* 95:303–308 (1987) (No month.

Gillery et al., Thermal Contraction of β–Eucryptite ($Li_2O \cdot Al_2O_3 \cdot 2SiO_2$) By X–Ray And Dilatometer Methods, *Journal Of The American Ceramic Society,* 42(4):175–177 (1959) (No month).

Haghighat et al., Processing And Sintering Of Sol–Gel Derived Lithium Aluminosilicate Powders, *Ceram. Eng. Sci. Proc.,* 10(7–8):707–719 (1989) (No month).

Hochella, Jr., et al., Structural Mechanisms Of Anomalous Thermal Expansion Of Cordierite–Beryl And Other Framework Silicates, *Journal Of The American Ceramic Society,* 69(1):13–18 (1986) (No month).

F.A. Hummel, Significant Aspects Of Certain Ternary Compounds And Solid Solutions, *Journal Of The American Ceramic Society,* 35(3):64–66 (1952) (No month).

(List continued on next page.)

*Primary Examiner*—Karl Group
*Assistant Examiner*—David Sample
*Attorney, Agent, or Firm*—Howell & Haferkamp, L.C.

[57] ABSTRACT

A ceramic material in the lithium aluminosilicate (LAS) system, having a negative coefficient of thermal expansion and improved mechanical properties, the material having a stoichiometric composition of $Li_{1+x}AlSiO_{4+X/2}$, where $0 \leq x \leq 0.1$. The ceramic material can be made by mixing silicon and aluminum oxides ($SiO_2$ and $Al_2O_5$) with lithium carbonate ($Li_2CO_3$) and calcining the mixture. Alternatively, the ceramic material can be made by mixing silicon oxide ($SiO_2$), lithium aluminate ($LiAlO_2$), and, if desired, lithium carbonate ($Li_2CO_3$), and calcining the mixture. Alternatively, the ceramic material can be made by mixing spodumene (an inexpensive mineral with a nominal composition of $LiAlSi_2O_6$), lithium aluminate ($LiAlO_2$), and the required amounts of other constituents ($Li_2CO_3$, $Al_2O_3$, or $SiO_2$), and calcining the mixture. Alternatively, the ceramic material can be made by mixing spodumene (nominally $LiAlSi_2O_6$) and the required amounts of other constituents ($Li_2CO_3$, $Al_2O_3$, or $SiO_2$), and calcining the mixture. The ceramics of this invention exhibit negative thermal expansion, and improved mechanical properties, which allow them to be used as components of thermostats and other products.

27 Claims, 8 Drawing Sheets

OTHER PUBLICATIONS

F.A. Hummel, Thermal Expansion Properties Of Some Synthetic Lithia Minerals, *Journal Of The American Ceramic Society*, 34(8):235–239 (1951) (No month).

Ishitsuka et al., Synthesis And Thermal Stability Of Aluminum Titanate Solid Solutions, *Journal Of The American Ceramic Society*, 70(2):69–71 (1987) (No month).

Kim et al., Formation And Characteristics Of Silicon Nitride–Lithium Aluminum Silicate Ceramics: Part I, Sintering And Microstructure, *Advanced Ceramic Materials*, 2(4):817–821 (1987) (No month).

Knickerbocker et al., Sinterable β–Spoddumene Glass–Ceramics, *Journal Of The American Ceramic Society*, 72(10):1873–1879 (1989) (No month).

Kobayashi et al., Preparation Of β–Spodumene Powder By Sol–Gel Process And Properties Of Sintered Bodies, *Journal Of The Ceramic Society Of Japan, Int. Edition*, 98–710:90–95 1990 (No month).

Korthuis et al., Negative Thermal Expansion And Phase Transitions In The $ZrV_{2-x}P_xO_7$ Series, *Chem. Mater.*, 7:412–417 (1995) (No month).

Limaye et al., Synthesis And Thermal Expansion Of $MZr_4P_6O_{24}$(M=Mg,Ca,Sr,Ba), *Journal Of The Ceramic Society*, 70(10):C232–C236 (1987) (No month).

Omori et al., Low–Expansion Ceramics In Zirconium Phosphate Systems, *Materials Science Forum*, 34–36:851–856 (1988) (No month).

Oota et al., Thermal Expansion Behavior of $NaZr_2(PO_4)_3$ Type Compounds, *Journal Of The American Ceramic Society*, 69(1):1–6 (1986) (No month).

Ostertag et al., Thermal Expansion Of Synthetic β–Spodumene and β–Spodumene–Silica Solid Solutions, *Journal Of The American Ceramic Society*, 51(11):651–654 (1968) (No month).

Ota et al., Electrical Conductivity And Thermal Expansion of $Nb_2O_5$ Ceramics, *Advanced Ceramic Materials*, 1(4):371–377 (1986) (No month).

Fred J. Parker, $Al_2TiO_5$–$ZrTiO_4$–$ZrO_2$ Composites: A New Family Of Low–Thermal–Expansion Ceramics, *Journal Of The American Ceramic Society*, 73(4):929–932 (1990) (No month).

Roy et al., Compositonal And Stability Relationships Among The Lithium Aluminosilicates: Eucryptite, Spodumene, And Petalite, *Journal Of The American Ceramic Society*, 33(5):152–159 (1950) (No month).

Roy et al., Very Low Thermal Expansion Coefficient Materials, *Annu. Rev. Mater. Sci.*, 19:59–81 (1989) (No month).

H. Schulz, Thermal Expansion Of Beta Eucryptite, *Journal Of The American Ceramic Society*, 57(7):313–318 (1974) (No month).

Edward J. Smoke, Ceramic Compositions Having Negative Linear Thermal Expansion, *Journal Of The American Ceramic Society*, 34(3): 87–90 (1951) (No month).

Tien et al., Studies In Lithium Oxide Systems, XIII, $Li_2O \cdot Al_2O_3 \cdot 2SiO_2$—$Li_2O \cdot Al_2O_3 \cdot 2GeO_2$, *Journal Of The American Ceramic Society*, 47(11):582–584 (1964) (No month).

Tindwa et al., Ionic Conductivities Of Phosphorous–Substituted β–Eucryptite Ceramics, 17(7):873–881 (1982) (No month).

Wohlfromm et al., Effect Of $ZrSiO_4$ And MgO Additions On Reaction Sintering And Properties Of $Al_2TiO_5$–Based Materials, *Journal Of Materials Science*, 25:3753–3764 (1990) (No month).

E.G. Wolff, Thermal Expansion In Metal/Lithia–Alumina––Silica (LAS) Composites, *International Journal Of Thermophysics*, 9(2):221–232 (1988) (No month).

Wu et al., Low–Thermal Expansion Polycrystalline Tantalum Tungstate Ceramics, *Journal Of Materials Science*, 22:2816–2822 (1987) (No month).

Yamai et al., Low–Thermal–Expansion Polycrystalline Zirconyl Phosphate Ceramic, *Journal Of The American Ceramic Society*, 68(5):273–278 (1985) (No month).

Yamai et al., Low–Thermal–Expansion Polycrystalline Zirconyl Phosphate Ceramic: Solid–Solution And Microcracking–Related Properties, *Journal Of The American Ceramic Society*, 70(8): 585–590 (1987) (No month).

CERAMICS HAVING NEGATIVE COEFFICIENT OF THERMAL EXPANSION, METHOD OF MAKING SUCH CERAMICS, AND PARTS MADE FROM SUCH CERAMICS

FIELD OF THE INVENTION

This invention relates to ceramic materials having a negative coefficient of thermal expansion, to a method of making such ceramic materials, and to parts made from such ceramic materials.

BACKGROUND OF THE INVENTION

Ceramic materials having negative coefficients of thermal expansion or which exhibit negative thermal expansion, i.e., which contract, rather than expand as their temperature increases, are known. In general, these materials have crystal structures with anisotropic thermal expansion, where expansion along one crystallographic direction is negative and expansion along a different direction is positive. Examples of ceramic materials exhibiting negative thermal expansion include lithium aluminosilicate ($LiAlSiO_4$), cordierite ($Mg_2A_4Si_5O_{18}$) and Ge-modified cordierite ($Mg_2Al_4Si_{4.2}Ge_{0.8}O_{18}$) compositions, aluminum titanate ($Al_2Ti_2O_5$) based compositions, calcium strontium zirconium phosphate ($Ca_{1-x}Sr_xZr_4P_6O_{24}$) and similar compositions, $Zr_2P_2O_9$, $ZrV_2O_7$, $Ta_2WO_8$, and $Nb_2O_5$. In polycrystalline form, these ceramics exhibit a "net" negative thermal expansion because the contractive component of thermal expansion is larger than the expansive component. A problem with known negative thermal expansion ceramic materials is that in many cases, the expansion anisotropy leads to microcracking, which reduces mechanical strength of sintered ceramics. There has been a need to develop suitable compositions and ceramic processing methods to allow the fabrication of high density and mechanically robust ceramic components of materials exhibiting negative thermal expansion behavior.

Of the various types of known negative thermal expansion ceramic materials, several ceramic compositions in the lithium aluminosilicate family exhibit the largest negative thermal expansion values. There are three identified negative-expansion compounds in the lithium aluminosilicate ceramic system: β-eucryptite ($LiAlSiO_4$), spodumene ($LiAlSi_2O_6$), and petalite ($LiAlSi_4O_{10}$). All of these compounds exhibit anisotropy in thermal expansion, with negative expansion in one crystallographic direction. Sintered β-eucryptite ceramics exhibit the most negative thermal expansion, with reported thermal expansion values ranging from –6 to –8 ppm/° C. (also known as $10^{-6}$ in/in/° C.). The β-eucryptite form of $LiAlSiO_4$ is stable above 970° C., whereas the α-eucryptite form is stable at lower temperatures. However, sintered $LiAlSiO_4$ ceramics which are processed above 970° C. always have the β-eucryptite structure, because the transformation from the α-form to the β-form that occurs during calcination (or sintering) is irreversible. Thermal expansion anisotropy of β-eucryptite, with a hexagonal crystal structure, is very large, with $\alpha_a \sim +8$ ppm/° C. and $\alpha_c \sim -17$ ppm/° C.

β-eucryptite ceramics can be readily formed using conventional ceramic methods of ball milling, calcination, and sintering. The $LiAlSiO_4$ composition can be modified by additions of up to about 50 mol % of both $AlPO_4$ and $LiAlGeO_4$, without affecting β-eucryptite phase formation or expansion behavior. With oxide starting materials, calcination temperatures of between about 1000 and about 1100° C. and sintering temperatures of between about 1200 and about 1300° C. have been used for the successful preparation of single-phase β-eucryptite ceramics. There also has been some work in the synthesis of β-eucryptite using sol-gel methods for powder preparation. The sol-gel method involves the use of expensive metal-organic precursors, but has some advantages related to controlling $Li_2O$ volatility and achieving high sintered densities. However, anisotropic thermal expansion has made it difficult to produce high strength LAS ceramics. A relatively low modulus of rupture or flexural strength value of 2000 psi (13.8 MPa) is typical for β-eucryptite ceramics.

SUMMARY OF THE INVENTION

The ceramic materials of this invention exhibit negative thermal expansion, yet have better mechanical properties than the negative thermal expansion ceramic materials previously available. Generally, the ceramic materials of this invention are in the $Li_2O$—$Al_2O_3$—$SiO_2$ (LAS) compositional system, and are preferably formed in the β-eucryptite phase or crystal structure. The LAS ceramics of this invention have stoichiometries represented by the formula:

$$Li_{1+X}AlSiO_{4+X/2}$$

Where $0 < x \leq 0.2$, and more preferably where $0 < x \leq 0.1$. Providing an excess of lithium oxide (as compared to the normal stoichiometric composition of $LiAlSiO_4$) reduces sintering temperature and results in an increase in mechanical strength. It is believed that an excess of lithium oxide will also permit an excess of $SiO_2$, with the benefit of having two phases in the ceramic material, which it is believed will also improve the physical properties of the ceramic material. Thus, LAS ceramics of this invention may have stoichiometries represented by the formula:

$$Li_{1+X}AlSi_{1+Y}O_{4+X/2+2Y}$$

Where $0 \leq X \leq 0.2$ and $0 \leq Y \leq 0.5$, and more preferably where $0 < X \leq 0.1$. The LAS ceramics of this invention typically exhibit high ceramic density (ρ) of between about 2.20 and about 2.27 g/cm³ when sintered at temperatures between 1150 and 1350° C., large negative coefficients of thermal expansion (α) of between about –6 and about –11 ppm/° C.), and relatively high flexural strengths (σ) of about 35 MPa compared to flexural strengths of about 13.8 MPa previously reported for LAS ceramics.

When X=0 and Y=0 in $Li_{1+X}AlSi_{1+Y}O_{4+X/2+2Y}$, the composition corresponds to $LiAlSiO_4$, which is the stoichiometry of LAS ceramics known as β-eucryptite. When X>0 in $Li_{1+X}AlSi_{1+Y}O_{4+X/2+2Y}$, then the composition has excess $Li_2O$ compared to β-eucryptite and high density LAS ceramics can be prepared with lower sintering temperatures. When Y>0 in $Li_{1+X}AlSi_{1+Y}O_{4+X/2+2Y}$, then the LAS ceramics are comprised of two crystalline phases, including β-eucryptite and spodumene. The advantage of such two-phase LAS ceramics is that they exhibit superior mechanical properties. It is also possible to substitute phosphorous or boron for silicon, without negatively impacting the thermal and mechanical properties.

A second aspect of this invention relates to methods of making negative thermal expansion ceramic materials, and in particular to powder processing methods that can be used to prepare LAS powders which can be used to prepare high-density LAS ceramics of the desired compositions. A first embodiment of a method of making negative thermal expansion ceramic materials in accordance with the principles of this invention includes the steps of preparing an intimate mixture of silicon and aluminum oxides ($SiO_2$ and $Al_2O_3$) with lithium carbonate ($Li_2CO_3$), calcining the mixture, followed by reducing the particle size of calcined mixture. A second embodiment of a method of making negative thermal expansion ceramic materials in accordance with this invention includes the steps of preparing intimate mixture of silicon oxide ($SiO_2$), lithium aluminate ($LiAlO_2$), and, if desired, lithium carbonate ($Li_2CO_3$), calcining the mixture at a temperature (preferably above about 970° C.), followed by reducing the particle size of the calcined mixture. A third embodiment of a method of making negative thermal expansion ceramic materials in accordance with the principles of this invention includes the steps of preparing an intimate mixture of spodumene (an inexpensive mineral with a nominal composition of $LiAlSi_2O_6$), lithium aluminate ($LiAlO_2$), and the required amounts of other constituents ($Li_2CO_3$, $Al_2O_3$, or $SiO_2$) required to adjust the composition as desired, calcining the mixture, followed by reducing the particle size of the calcined mixture. A fourth embodiment of a method of making negative thermal expansion ceramic materials in accordance with the principles of this invention includes the steps of preparing an intimate mixture of spodumene (nominally $LiAlSi_2O_6$) and the required amounts of other constituents ($Li_2CO_3$, $Al_2O_3$, or $SiO_2$) required to adjust the composition as desired, calcining the mixture, followed by reducing the particle size of the calcined mixture.

The method of making intimate mixtures in each of the embodiments of this invention may involve ball milling, with or without a solvent (which may be water, ethyl alcohol, or isopropyl alcohol). The calcination temperature in each embodiment must be high enough to assure complete conversion of lithium carbonate to lithium oxide and subsequent reaction of lithium oxide with silicon oxide, aluminum oxide, lithium aluminate, and/or spodumene precursors. If this calcination temperature is greater than about 970° C., then single-phase LAS powders with the β-eucryptite structure can be prepared. However, calcination temperatures lower than about 970° C. can be used to prepare single-phase and high-density β-eucryptite ceramics, as long as the sintering temperature used to prepare the LAS ceramic exceeds about 970° C. After calcination, any of several methods can be used to reduce the particle size of the LAS ceramic powder to a size range suitable for ceramic fabrication. Post-calcination particle size reduction methods may include: ball, vibratory or attrition milling (with or without a solvent, which may be water, ethyl alcohol, or isopropyl alcohol), jet milling, or any other particle size reduction method known to those skilled in the art.

A third aspect of the invention is parts fabricated from negative thermal expansion ceramic materials. One example of a part that might be fabricated from the negative thermal expansion ceramic materials of this invention are ceramic tubes used in certain types of thermostats, as disclosed in co-pending U.S. patent application entitled Thermostat Having a Temperature Sensing Element Which Includes a Member Having a Negative Coefficient of Thermal Expansion. The high densities and good mechanical properties achieved by the ceramics of this invention may make these materials useful as a lithium ion conductors in certain types of batteries

DETAILED DESCRIPTION OF THE PREFERRED EMBODIMENTS

The ceramic materials of the present invention are of the lithium aluminosilicate (LAS) system, and exhibit large negative coefficients of thermal expansion, yet in accordance with the present invention have superior mechanical properties to prior known LAS ceramic materials. These materials have compositions given by one of the following formulas: $LiAlSiO_4$, $LiASi_{1+X}O_{4+2X}$, $Li_{1+X}AlSiO_{4+X/2}$, or $Li_{1+X}AlSi_{1+Y}O_{4+x/2+2Y}$. In accordance with another aspect of this invention, these materials are processed to provide a single-phase powder having a β-eucryptite crystal structure. In accordance with yet another aspect of this invention, the materials are processed and sintered to produce high-density LAS ceramic parts with the β-eucryptite crystal structure.

Figure 1:
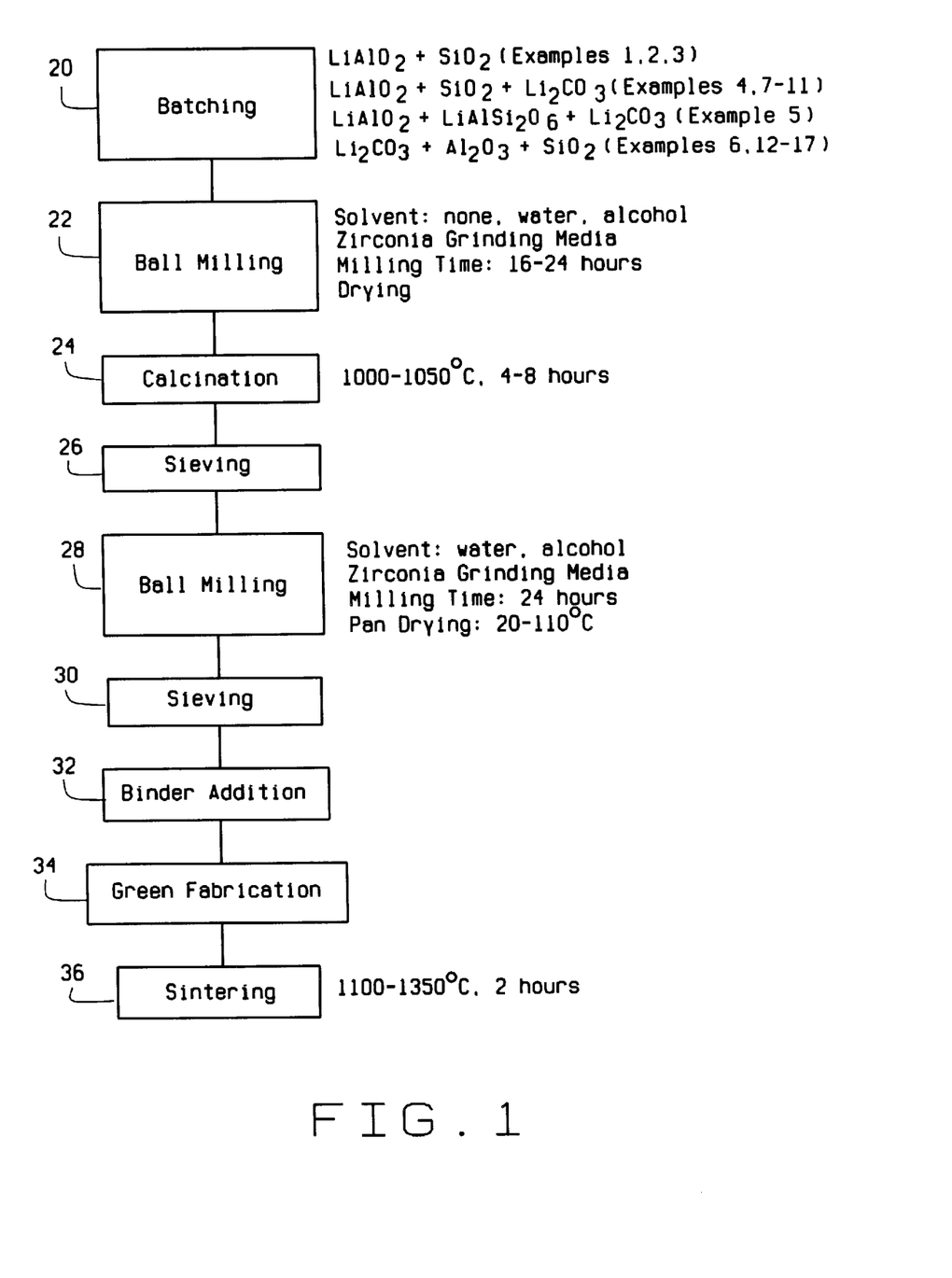
FIG. 1 is a flow chart of the process for making negative thermal expansion ceramics in accordance with the principles of this invention.

As detailed in the following examples, several LAS compositions were prepared generally in accordance with the method illustrated in FIG. 1, which shows the steps for preparing a ceramic material with a negative thermal expansion. At step 20, the raw materials for the ceramic are selected and combined. As described below, in Examples 1, 2, and 3, $LiAlO_2$ and $SiO_2$ are combined; in Examples 4 and 7 through 11, $LiAiO_2$, $SiO_2$, and $Li_2CO_3$ are combined; in Example 5, $LiAlO_2$, $LiASi_2O_6$, and $Li_2CO_3$ are combined; and in Examples 6, and 12 through 17, $Li_2CO_3$, $Al_2O_3$, and $SiO_2$ are combined. At step 22, the mixture of raw materials is intimately mixed. This is preferably done in a ball mill. The milling may be dry, or a solvent, such as water or alcohol, may be used. Zirconia (or aluminum oxide) grinding media is preferably used in the ball mill to facilitate the mixture of the raw materials. Typical milling times range from 16 to 24 hours. If a solvent is used, the milled material is dried before further processing. At step 24, the thoroughly mixed material is calcined, preferably at between about 800° C. and about 1100° C. (and more preferably between about 1000° C. and about 1050° C.) for between about four and about eight hours. After calcining, the particle size of the calcined mixture is reduced. This can be done by sieving the calcined mixture at step 26, and then ball milling the calcined mixture at step 28. This ball milling is preferably done with a solvent, such as water or alcohol and a zirconia grinding media. However, the ball milling can be done without solvent, if desired. The material is preferably milled for about 24 hours. Vibratory milling, jet milling, attrition milling, or any other particle size reduction method suitable for reducing the particle size in the calcined mixture for subsequent sintering, may be used. After milling, the calcined, sieved, and milled mixture is again sieved at step 30.

Binder is added to the mixture at step 32, and at step 34 a green ceramic material is formed by isostatic pressing. Finally at step 36, the green ceramic material is sintered.

Of course, dopants, such as phosphorous and boron, can be included in the ceramic composition, to further reduce sintering temperature and/or improve mechanical properties, without departing from the teachings of this invention.

The following examples show the ceramic materials of the present invention, and the method of making those ceramic materials. Each example describes the preparation of an intimately mixed powder for making ceramics in accordance with the principles of this invention.

EXAMPLE 1A

A 150-gram batch of LAS powder with the $LiAlSiO_4$ stoichiometry was prepared from $LiAlO_2$ and $SiO_2$ precursors. The batch was ball milled for 24 hours in a one-liter nalgene jar with 1500 grams of zirconia grinding media and 450 ml of distilled water, dried at 110° C., and sieved through a 40-mesh screen. About 100 grams of this LAS powder was calcined at 1000° C. for eight hours, about 50 grams of this LAS powder was calcined at 1050° C. for eight hours

EXAMPLE 1C

A 150-gram batch of LAS powder with the $LiAlSiO_4$ stoichiometry was prepared using $LiAlO_2$ and $SiO_2$ precursors. The batch was ball milled for 12 hours in a one-liter nalgene jar with 1500 grams of zirconia grinding media and 300 ml of ethyl alcohol, dried at 80° C., and crushed into a fine powder (Example 1C).

EXAMPLE 2

A 150-gram batch of LAS powder with a stoichiometry of $LiAlSi_{1.2}O_{4.4}$ was prepared using $LiAlO_2$ and $SiO_2$ precursors. The batch was ball milled for 24 hours in a one-liter nalgene jar with 1500 grams of zirconia grinding media and 450 ml distilled water, dried at 110° C., and sieved through a 40-mesh screen. Samples of about 50 gram of the milled LAS powder were calcined at 1000° C. and 1050° C. for eight hours.

EXAMPLE 3

A 150-gram batch of LAS powder with a stoichiometry of $LiAlSi_{1.5}O_{5.0}$ was prepared using $LiAlO_2$ and $SiO_2$ precursors. The batch was ball milled for 24 hours in a one-liter nalgene jar with 1500 grams of zirconia grinding media and 400 ml distilled water, dried at 110° C., and sieved through a 40-mesh screen. Samples of about 50 grams of the milled LAS powders were calcined at 1000 and 1050° C. for eight hours.

EXAMPLE 4

A 150-gram batch of LAS powder with a stoichiometry of $Li_{1.02}AlSiO_{4.01}$ or was prepared using $LiAlO_2$, $SiO_2$, and $Li_2CO_3$ precursors. The batch was ball milled for 24 hours in a one-liter nalgene jar with 1500 grams of zirconia grinding media and 400 ml of ethyl alcohol, dried at 80° C., and sieved through a 40-mesh screen. A sample of about 50 grams of the milled LAS powder was calcined at 1000° C. for eight hours and then crushed into a fine powder (Example 4A), and a sample of about 100 grams of the milled LAS powder was calcined at 1000° C. for eight hours and then crushed into a fine powder (Example 4B).

EXAMPLE 5

A 150-gram batch of LAS powder with a stoichiometry of $Li_{1.02}AlSiO_{4.01}$ was prepared using $LiAl_2Si_2O_6$ (spodumene), $LiAlO_2$, and $Li_2CO_3$ precursors. (The $LiAl_2Si_2O_6$ raw material is a mined-and-crushed mineral, with a considerable impurity content, e.g., sodium, potassium, phosphorous). The amounts of $LiAlO_2$ and $Li_2CO_3$ were adjusted, based on the chemical analysis of the spodumene powder provided by the supplier. The batch was ball milled for 24 hours in a one-liter nalgene jar with 1500 grams of zirconia grinding media and 300 ml of ethyl alcohol, dried at 80° C., and sieved through a 40-mesh screen. A sample of about 50 grams of the milled LAS powder was calcined at 1000° C. for eight hours and then crushed into a fine powder (Example 5A), and a sample of about 100 grams of the milled LAS powder was calcined at 1000° C. for eight hours and then crushed into a fine powder (Example 5B).

EXAMPLE 6

A 150-gram batch of LAS powder with a stoichiometry of $Li_{1.01}AlSiO_{4.005}$ was prepared using $Li_2CO_3$, $Al_2O_3$, and $SiO_2$ precursors. The batch was ball milled for 24 hours in one-liter nalgene jars with 2000 grams of zirconia grinding media and 312 grams of isopropyl alcohol, dried, and sieved through a 60-mesh screen. A sample of about 50 grams of the milled LAS powder was calcined at 800° C. for 8 hours, a second sample of about 50 grams of the milled LAS powder was calcined at 900° C. for eight hours, and a third sample of about 50 grams of the milled LAS powder was calcined at 1000° C. for 8 hours. The calcined LAS powders were then sieved through a 60-mesh screen.

EXAMPLE 7

A 600-gram batch of LAS powder with a stoichiometry of $Li_{1.01}AlSiO_{4.005}$ was prepared using $LiAlO_2$, $SiO_2$, and $Li_2CO_3$ precursors. The batch was ball milled for 24 hours in a four-liter nalgene jar with 8000 grams of zirconia grinding media and 1250 grams of isopropyl alcohol, dried at 110° C., and sieved through a 60-mesh screen. The milled LAS powder was calcined at 1000° C. for eight hours, and then sieved through a 60-mesh screen.

EXAMPLE 8

A 150-gram batch of LAS powder with a stoichiometry of $Li_{1.005}AlSiO_{4.0025}$ was prepared using $LiAlO_2$, $SiO_2$, and $Li_2CO_3$ precursors. The batch was ball milled for 24 hours in a one-liter nalgene jar with 2000 grams of zirconia grinding media and 312 grams of isopropyl alcohol, dried at 110° C., and sieved through a 60-mesh screen. The milled LAS powder was calcined at 1000° C. for eight hours, and sieved through a 60-mesh screen.

EXAMPLE 9

A 150-gram batch of LAS powder with a stoichiometry of $Li_{1.005}AlSiO_{4.0025}$ was prepared using $LiAlO_2$, $SiO_2$, and $Li_2CO_3$ precursors. The batch was ball milled for 24 hours in a one-liter nalgene jar with 2000 grams of zirconia grinding media and 312 grams of isopropyl alcohol, dried at 110° C., and sieved through a 60-mesh screen. A sample of about 50 grams of the milled LAS powder was calcined at 800° C. for eight hours, a second sample of about 50 grams of the milled LAS powder was calcined at 900° C. for eight hours, and a third sample of about 50 grams of the milled LAS powder was calcined at 1000° C. The calcined LAS powder was sieved through a 60-mesh screen.

EXAMPLE 10

A 150-gram batch of LAS powder with a stoichiometry of $Li_{1.02}AlSiO_{4.01}$ was prepared using $LiAlO_2$, $SiO_2$, and $Li_2CO_3$ precursors. The batch was ball milled for 24 hours in one-liter nalgene jar with 2000 grams of zirconia grinding media and 312 grams of isopropyl alcohol, dried at 110° C., and sieved through a 60-mesh screen. The milled LAS powder was calcined at 1000° C. for eight hours, and sieved through a 60-mesh screen.

EXAMPLE 11

A 150-gram batch of LAS powder with a stoichiometry of $Li_{1.01}AlSiO_{4.005}$ was prepared using $LiAlO_2$, $SiO_2$, and $Li_2CO_3$ precursors. The batch was ball milled (dry) for 24 hours in a one-liter nalgene jar with 2000 grams of zirconia grinding media, and sieved through a 60-mesh screen. A portion of the milled LAS powder was calcined at 800° for eight hours, a portion of the milled LAS power was calcined at 900° C. for eight hours, and a portion of the milled LAS powder was calcined at 1000° C. for eight hours, and then sieved through a 60-mesh screen.

EXAMPLE 12

A 600-gram batch of LAS powder of a stoichiometry of $Li_{1.01}AlSiO_{4.005}$ was prepared using $Li_2CO_3$, $Al_2O_3$, and $SiO_2$ precursors. The batch was ball milled for 24 hours in a four-liter nalgene jar with 8000 grams of zirconia grinding media and 1250 grams of isopropyl alcohol. After drying at 110° C., the LAS powder were sieved through a 60-mesh screen and calcined at 1000° C. for 4 hours and then sieved through a 60-mesh screen.

EXAMPLE 13

A 150-gram batch of LAS powder with a stoichiometry of $Li_{1.01}AlSiO_{4.005}$ was prepared using $Li_2CO_3$, $Al_2O_3$, and $SiO_2$ precursors. The batch was ball milled for 24 hours in a one-liter nalgene jar with 2000 grams of zirconia grinding media and 312 grams of isopropyl alcohol, dried, and sieved through a 60-mesh screen. The milled LAS powder was calcined at 1000° C. for 8 hours, and then sieved through a 60-mesh screen.

EXAMPLES 14

A 150-gram batch of LAS powder with a stoichiometry of $Li_{1.01}AlSiO_{4.005}$ was prepared using $Li_2CO_3$, $Al_2O_3$, and $SiO_2$ precursors. The batch was ball milled for 24 hours in a one-liter nalgene jar with 2000 grams of zirconia grinding media and 312 grams of isopropyl alcohol, dried, and sieved through a 60-mesh screen. The milled LAS powder was calcined at 1000° C. for 8 hours, and then sieved through a 60-mesh screen.

EXAMPLE 15

A 600-gram batch of LAS powder of a stoichiometry of $Li_{1.01}AlSiO_{4.005}$ was prepared using $Li_2CO_3$, $Al_2O_3$, and $SiO_2$ precursors. The batch was ball milled for 24 hours in a four-liter nalgene jar with 8000 grams of zirconia grinding media and 1250 grams of isopropyl alcohol. After drying at 110° C., the LAS powder was sieved through a 60-mesh screen and calcined at 1000° C. for 8 hours, and then sieved through a 60-mesh screen.

EXAMPLE 16

A 600-gram batch of LAS powder with a stoichiometry of $Li_{1.02}AlSiO_{4.01}$ was preparing using the $Li_2CO_3$, $Al_2O_3$, and $SiO_2$ precursors listed in Table 1. The batch was ball milled for 24 hours in a four-liter nalgene jar with 8000 grams of zirconia grinding media, 1250 grams of isopropyl alcohol, and six grams of a polymeric dispersant (ICI, KD-2). After drying at 110° C., the LAS powders were sieved through a 60-mesh screen and calcined at 1000° C. for eight hours, and then sieved through a 60-mesh screen.

EXAMPLE 17

A 600-gram batch of LAS powder of a stoichiometry of $Li_{1.01}AlSiO_{4.005}$ was prepared using $Li_2CO_3$, $Al_2O_3$, and $SiO_2$ precursors. The batch was ball milled for 24 hours in a four-liter nalgene jar with 8000 grams of zirconia grinding media and 1250 grams of isopropyl alcohol. 1 wt % of a polymeric dispersant (ICI, KD-2) was added to improve homogeneity during milling. After drying at 110° C., the LAS powder was sieved through a 60-mesh screen and calcined at 1000° C. for 8 hours, and then sieved through a 60-mesh screen.

TABLE 1

LAS Compositions and Raw Materials

| Example | Composition | Raw Materials (*) |
|---|---|---|
| 1A | $Li_{1.0}Al_{1.0}Si_{1.0}O_{4.0}$ | $LiAlO_2$ (a), $SiO_2$ (g) |
| 1B | $Li_{1.0}Al_{1.0}Si_{1.0}O_{4.0}$ | $LiAlO_2$ (b), $SiO_2$ (g) |
| 1C | $Li_{1.0}Al_{1.0}Si_{1.0}O_{4.0}$ | $LiAlO_2$ (b), $SiO_2$ (g) |
| 1D | $Li_{1.0}Al_{1.0}Si_{1.0}O_{4.0}$ + 0.5 wt % $P_2O_5$ | $LiAlO_2$ (a), $SiO_2$ (g), $(NH_4)_2HPO_4$ (l) |
| 2 | $Li_{1.0}Al_{1.0}Si_{1.2}O_{4.4}$ | $LiAlO_2$ (b), $SiO_2$ (g) |
| 3 | $Li_{1.0}Al_{1.0}Si_{1.5}O_{5.0}$ | $LiAlO_2$ (b), $SiO_2$ (g) |
| 4 | $Li_{1.02}Al_{1.0}Si_{1.0}O_{4.01}$ | $LiAlO_2$ (a), $SiO_2$ (g), $Li_2CO_3$ (c) |
| 5 | $Li_{1.02}Al_{1.0}Si_{1.0}O_{4.01}$ | $LiAlSi_2O_6$ (h), $LiAlO_2$ (a), $Li_2CO_3$ (c) |
| 6 | $Li_{1.01}Al_{1.0}Si_{1.0}O_{4.005}$ | $Li_2CO_3$ (d), $Al_2O_3$, $SiO_2$ (g) |
| 7 | $Li_{1.01}Al_{1.0}Si_{1.0}O_{4.005}$ | $LiAlO_2$ (a), $SiO_2$ (g), $Li_2CO_3$ (d) |
| 8 | $Li_{1.005}Al_{1.0}Si_{1.0}O_{4.0025}$ | $LiAlO_2$ (a), $SiO_2$ (g), $Li_2CO_3$ (d) |
| 9 | $Li_{1.01}Al_{1.0}Si_{1.0}O_{4.005}$ | $LiAlO_2$ (a), $SiO_2$ (g), $Li_2CO_3$ (d) |
| 10 | $Li_{1.02}Al_{1.0}Si_{1.0}O_{4.01}$ | $LiAlO_2$ (a), $SiO_2$ (g), $Li_2CO_3$ (d) |
| 11 | $Li_{1.01}Al_{1.0}Si_{1.0}O_{4.005}$ | $LiAlO_2$ (a), $SiO_2$ (g), $Li_2CO_3$ (d) |
| 12 | $Li_{1.01}Al_{1.0}Si_{1.0}O_{4.005}$ | $Li_2CO_3$ (e), $Al_2O_3$ (i), $SiO_2$ (g) |
| 13 | $Li_{1.01}Al_{1.0}Si_{1.0}O_{4.005}$ | $Li_2CO_3$ (d), $Al_2O_3$ (k), $SiO_2$ (g) |
| 14 | $Li_{1.01}Al_{1.0}Si_{1.0}O_{4.005}$ | $Li_2CO_3$ (e), $Al_2O_3$ (i), $SiO_2$ (g) |
| 15 | $Li_{1.01}Al_{1.0}Si_{1.0}O_{4.005}$ | $Li_2CO_3$ (e), $Al_2O_3$ (i), $SiO_2$ (g) |
| 16 | $Li_{1.02}Al_{1.0}Si_{1.0}O_{4.01}$ | $Li_2CO_3$ (f), $Al_2O_3$ (i), $SiO_2$ (g) |
| 17 | $Li_{1.01}Al_{1.0}Si_{1.0}O_{4.005}$ | $Li_2CO_3$ (f), $Al_2O_3$ (j), $SiO_2$ (g) |

(*) Raw Materials
$LiAlO_2$: (a) Cypress-Foote HSA-10; (b) Cypress-Foote HSA-19
$Li_2CO_3$: (c) Baker reagent; (d) FMC-reagent, (e) FMC technical, (f) Minsal technical
$SiO_2$: (g) U.S. Silica Min-U-Sil-5
$LiAl_2Si_2O_6$: (h) Gwalia Spodumene
$Al_2O_3$: (i) Alcoa A-165G; (j) Alcoa A-1000; (k) Baikowsky CR-10
$(NH_4)_2HPO_4$: (l) VWR reagent After powder preparation, x-ray diffraction was used to determine crystalline phase constitution, and sintering studies were performed on the example LAS powders to determine the effects of composition and powder synthesis methods on sintering performance, microstructure, thermal expansion, and mechanical properties of LAS ceramics. Organic binders, either polyethylene glycol (Union Carbide, 20M) or polyvinyl butyrol (Monsanto, B76) were added, in amounts of between about 2 and about 4 percent by weight, to facilitate preparation of green disc samples. The binders were added in two ways: either during the second ball milling step (after calcination), or as a separate ball milling step. The specific binders used, and the methods used to add the binders to the LAS powders, had no apparent effect on subsequent sintering performance. Green disc samples were prepared by uniaxial pressing at 69 MPa, followed by cold isostatic pressing at 345 MPa. For sintering studies, small discs were prepared using a 1.4-cm diameter uniaxial pressing die, whereas a larger (6-cm) die was used to prepare large disc samples (which, after sintering, were machined into specimens required for thermal and mechanical property measurements. After isostatic pressing, the green LAS discs were approximately 60% dense, based on measurements of dimensions and weight. Sintering was performed in air at temperatures of 1100 through 1350° C., according to the following schedule:

100° C./hour heating to 400° C.

1 hour hold at 400° C. (binder burnout)

200° C./hour heating to the sintering temperature (1100 to 1350° C.)

two-hour hold at the sintering temperature

200° C./hour cooling from the sintering temperature

For sintering of larger disc samples, slower heating rates (50~100° C.) were used during heating to the binder burnout and sintering temperatures. Densities of sintered LAS discs were measured from their weights and dimensions, after carefully polishing disc faces parallel. Sintered discs were characterized by x-ray diffraction to determine crystalline phase constitution. Thermal expansion and mechanical property measurements were performed.

Figure 2:
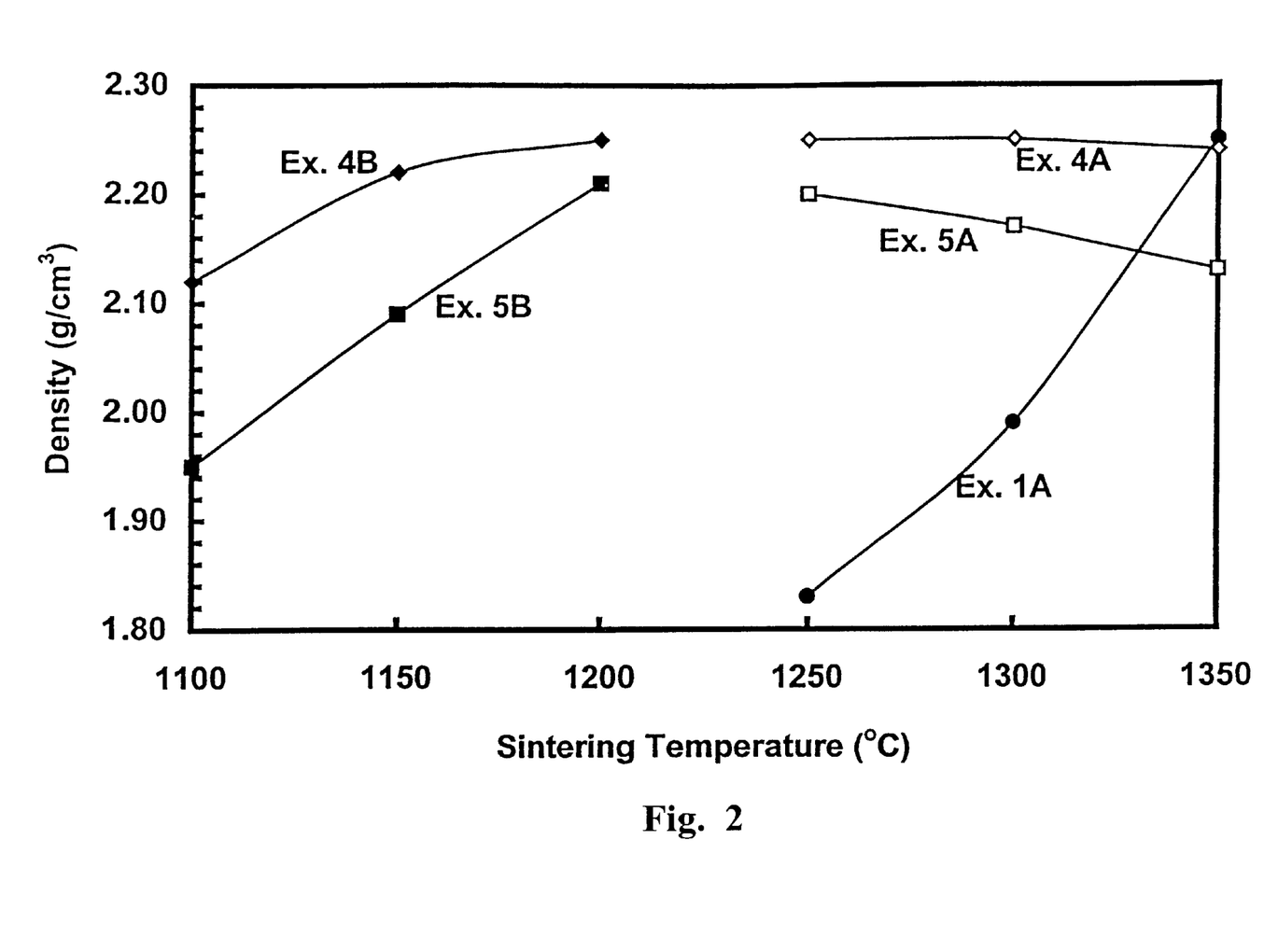
FIG. 2 is a graph of density versus sintering temperature for ceramic materials made in accordance with Examples 1A, 4A, 4B, 5A, and 5B.

Calcined and sieved LAS powders from Examples 1A, 2, 3, 4A, and 5A, were milled for 12 hours in 500-ml nalgene jars, containing 50 grams of LAS powder, 650 grams of zirconia media, and 100 ml of water. 0.5 wt % $P_2O_5$ addition was made to a sample of LAS powder from Example 1A (calcined at 1000° C.) by adding an appropriate amount of soluble $(NH_4)_2HPO_4$ during aqueous ball milling, and after milling, the LAS powder was dried at 110° C. and sieved through 60 mesh. About 150 grams of calcined and crushed LAS powder from Example 1C was ball milled for 36 hours in a one-liter nalgene jar containing 1500 grams of zirconia grinding media and 300 ml of ethyl alcohol, dried at 80° C., and sieved through a 100-mesh screen. About 100 grams of calcined and crushed LAS powder from Examples 4B and 5B, was ball milled for 24 hours in 500-ml nalgene jar containing 1000 grams of zirconia grinding media and 200 ml of ethyl alcohol, dried at 80° C., and sieved through a 100-mesh screen. LAS discs were formed and sintered according to the above-described schedule. The densities were measured, and the results reported in Table 2, below. The density measurements for the material from Examples 1A, 4A, 4B, 5A, and 5B are shown in FIG. 2.

1A and 1C), although a relatively high sintering temperature of 1350° C. was required to achieve these densities. The use of an alcohol solvent instead of water (compare Example 1C with Example 1A) during initial ball milling, appeared to have no effect on sintering performance. The same high density of 2.25 g/cm$^3$ was obtained with a sintering temperature of 1350° C. in stoichiometric LiAlSiO$_4$ ceramics with 1 wt % $P_2O_5$ (see Example 1D). A relatively high density could be achieved at lower sintering temperature in LAS powers having an excess of Li$_2$O (see Examples 4A, 4B, 5A and 5B), although the density of lithium-oxide-excess LAS ceramic materials derived from LiAlSi$_2$O$_6$ (spodumene) raw materials (Examples 4A and 4B) were slightly lower than the density of lithium-oxide-excess LAS ceramic materials derived from LiAlO$_2$ raw materials (Examples 5A and 5B). Sintering temperatures of about 1200° C. or above appear to achieve a relatively high density ceramic material for LAS compositions with an excess of Li$_2$O (as compared to the stochiometric composition of LiAlSiO$_4$).

The calcination temperature (1000° C. versus 1050° C.) appeared to have no effect on the ultimate densification of the LAS ceramics of Examples 1A, 2, and 3.

The densities of LiAiSiO$_4$ ceramics with excess SiO$_2$ (Examples 2 and 3) were lower than those of stoichiometric LiAlSiO$_4$ ceramics (Examples 1A and 1C). These compositions, which provide LAS ceramics with two crystalline phases (spodumene and β-eucryptite), would be expected to have improved mechanical properties if high densities could be achieved (perhaps by addition of excess lithium oxide).

About 50 grams of calcined and sieved LAS powder from Examples 6, 8, 9, 10, and 11, was ball milled for 16 hours in 250-ml nalgene jars, containing 650 grams of zirconia media and 100 grams of water. These LAS powders then were dried at 110° C. and sieved through a 100-mesh screen. About 40 grams of calcined and sieved LAS powder from Examples 13 and 14 was ball milled for 24 hours in 250-ml nalgene jars, containing 500 grams of zirconia media and 60 grams of water. These LAS powders were dried at 110° C. and sieved through a 100-mesh screen.

50-gram samples of calcined and sieved LAS powder from Examples 7 and 12 were ball milled for 24 hours in 250-ml nalgene jars with 500 grams of zirconia media. For

TABLE 2

Sintering Performance of LAS Powders (Examples 1 through 5)

| | | Density (g/cm$^3$) | | | | | |
|---|---|---|---|---|---|---|---|
| Example | T$_{CALCINE}$ (°C.) | 1100° C. | 1150° C. | 1200° C. | 1250° C. | 1300° C. | 1350° C. |
| 1A | 1000 | — | — | — | 1.83 | 1.99 | 2.25 |
|    | 1050 | — | — | — | — | — | 2.24 |
| 1C | 1000 | — | — | — | 1.78 | — | 2.26 |
| 1D | 1000 | — | — | — | — | — | 2.25 |
| 2  | 1000 | — | — | 1.57 | 1.71 | 1.93 | 2.13 |
|    | 1050 | — | — | — | — | — | 2.19 |
| 3  | 1000 | — | — | 1.55 | 1.65 | 1.73 | 1.81 |
|    | 1050 | — | — | — | — | — | 1.79 |
| 4A | 1000 | — | — | — | 2.25 | 2.25 | 2.24 |
| 4B | 1000 | 2.12 | 2.22 | 2.25 | — | — | — |
| 5A | 1000 | — | — | — | 2.20 | 2.17 | 2.13 |
| 5B | 1000 | 1.95 | 2.09 | 2.21 | — | — | — |

Generally, densities of 2.25 g/cm$^3$ (95.7 percent of the theoretical value of 2.35 g/cm$^3$) were obtained in LAS ceramics of the stoichiometric LiAlSiO$_4$ powder (Examples one sample from each of Examples 7 and 12, 75 grams of water (Examples 7A and 12A) was used as a solvent during ball milling, and for another sample from each of Examples 7 and 12, 60 grams of isopropyl alcohol (Examples 7B and 12B) was used as a solvent during ball milling. These LAS powders were dried at 110° C. and sieved through a 100-mesh screen.

About 600 grams of calcined and sieved LAS powder from Examples 15, 16, and 17, was ball milled for 24 hours in a four-liter nalgene jar with 700 ml of water and 8000 grams of zirconia media and dried at 110° C. These LAS powders were then dried at 110° C., and sieved through a 100-mesh sieve. Small green disc samples were prepared from the LAS powders of Examples 6 through 17, by the previously described uniaxial and isostatic pressing methods. The green discs were sintered in air at temperatures of 1150° C., 1200° C., 1250° C., 1300° C., and 1350° C., according to the schedule described above. The density measurements for the sintered materials are shown in Table 3, and the density of sintered material from Examples 8, 9, and 10 is shown graphically in FIG. 3.

TABLE 3

Sintering Performance of LAS Powders (Examples 6 through 17)

| Example | $T_{CALCINE}$ (° C.) | Densities (g/cm$^3$) | | | | |
|---|---|---|---|---|---|---|
| | | 1150° C. | 1200° C. | 1250° C. | 1300° C. | 1350° C. |
| 6 | 1000 | 2.04 | 2.13 | 2.24 | 2.25 | 2.22 |
| 7A | 1000 | 1.97 | 2.08 | 2.14 | 2.24 | 2.22 |
| 7B | 1000 | 1.94 | 2.05 | 2.11 | 2.25 | 2.23 |
| 8 | 1000 | 1.90 | 2.04 | 2.18 | 2.25 | 2.21 |
| 9 | 1000 | 2.06 | 2.12 | 2.24 | 2.27 | 2.21 |
| 10 | 1000 | 2.23 | 2.24 | 2.28 | 2.25 | 2.19 |
| 11 | 1000 | 2.01 | 2.09 | 2.19 | 2.23 | 2.21 |
| 12A | 1000 | 2.23 | 2.27 | 2.26 | 2.25 | 2.20 |
| 12B | 1000 | 2.21 | 2.25 | 2.24 | 2.25 | 2.17 |
| 13 | 1000 | 2.09 | 2.18 | 2.22 | 2.23 | 2.23 |
| 14 | 1000 | 2.19 | 2.27 | 2.26 | 2.26 | 2.24 |
| 15 | 1000 | 2.25 | 2.28 | 2.27 | 2.26 | 2.20 |
| 16 | 1000 | 2.27 | 2.28 | 2.26 | 2.24 | 2.16 |
| 17 | 1000 | 2.22 | 2.25 | 2.23 | 2.25 | 2.19 |

Figure 3:
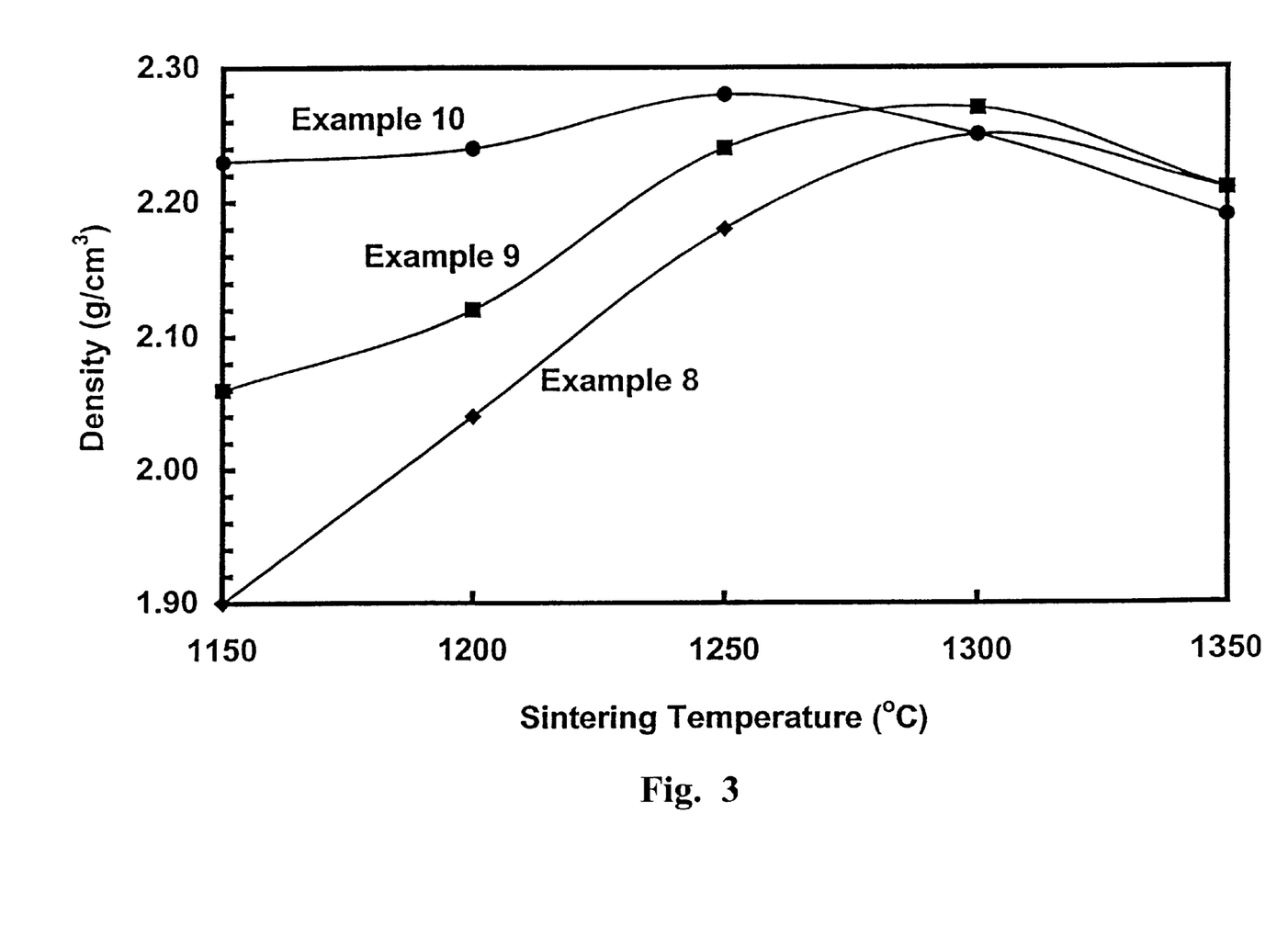
FIG. 3 is a graph of density versus sintering temperature for ceramic materials made in accordance with Examples 8, 9, and 10.

As shown in FIG. 3, the density of LAS ceramics formed by sintering at lower temperatures (i.e., temperatures below about 1300° C.) increases as with the amount of excess of $Li_2O$ in the composition $Li_{1-x}AlSiO_{4+X/2}$. Compare the results for Example 8 where x=0.005, with Example 9 where x=0.01, with Example 10 wherein x=0.02.

In comparing LAS powders of similar compositions and processing methods, it appears that LAS powders prepared from oxide/carbonate precursors (i.e., $SiO_2$, $Al_2O_3$, and $Li_2CO_3$) provide essentially the same sintering performance as LAS powers prepared using $LiAlO_2$ as a precursor.

The use of aqueous versus non-aqueous ball milling after calcination appeared to have no effect on sintering performance. Compare Example 7A (aqueous) with Example 7B (non-aqueous) and Example 12A (aqueous) with Example 12B (non-aqueous).

As shown in Table 3, the use of calcination temperatures of 800° C., 900° C., and 1000° C., appeared to have little effect on the sintered densities obtained from the LAS powder of Example 9.

Wet milling prior to calcination appears to increase the sintered density. Compare the density of the LAS powder of Example 11, which was prepared with dry milling prior to calcination, to the densities of the LAS powders of Examples 7 and 9, which were prepared with the same composition and processing approach, but with a wet-milling step prior to calcination.

Sintered densities of 96–97 percent of theoretical were obtained in ceramics prepared from LAS powder of Example 16, which represented the highest density obtained at low temperature sintering (about 1150° C. to about 1200° C.) consistent with the amount of excess $Li_2O$ in the composition.

Figure 4:
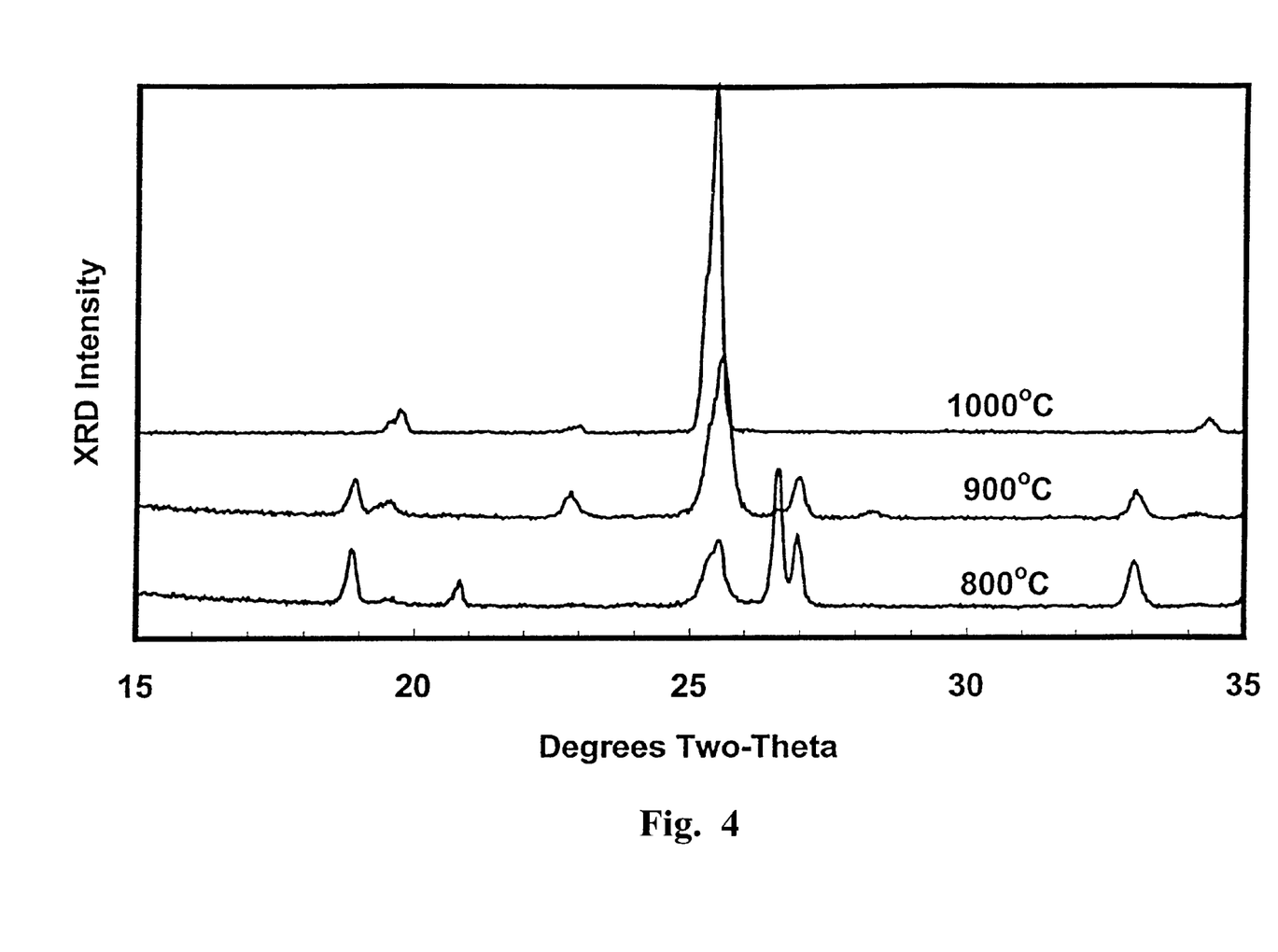
FIG. 4 is a graph of x-ray diffraction patterns of a ceramic material made in accordance with Example 6, calcined for eight hours at 800° C., 900° C., and 1000° C.
Figure 5:
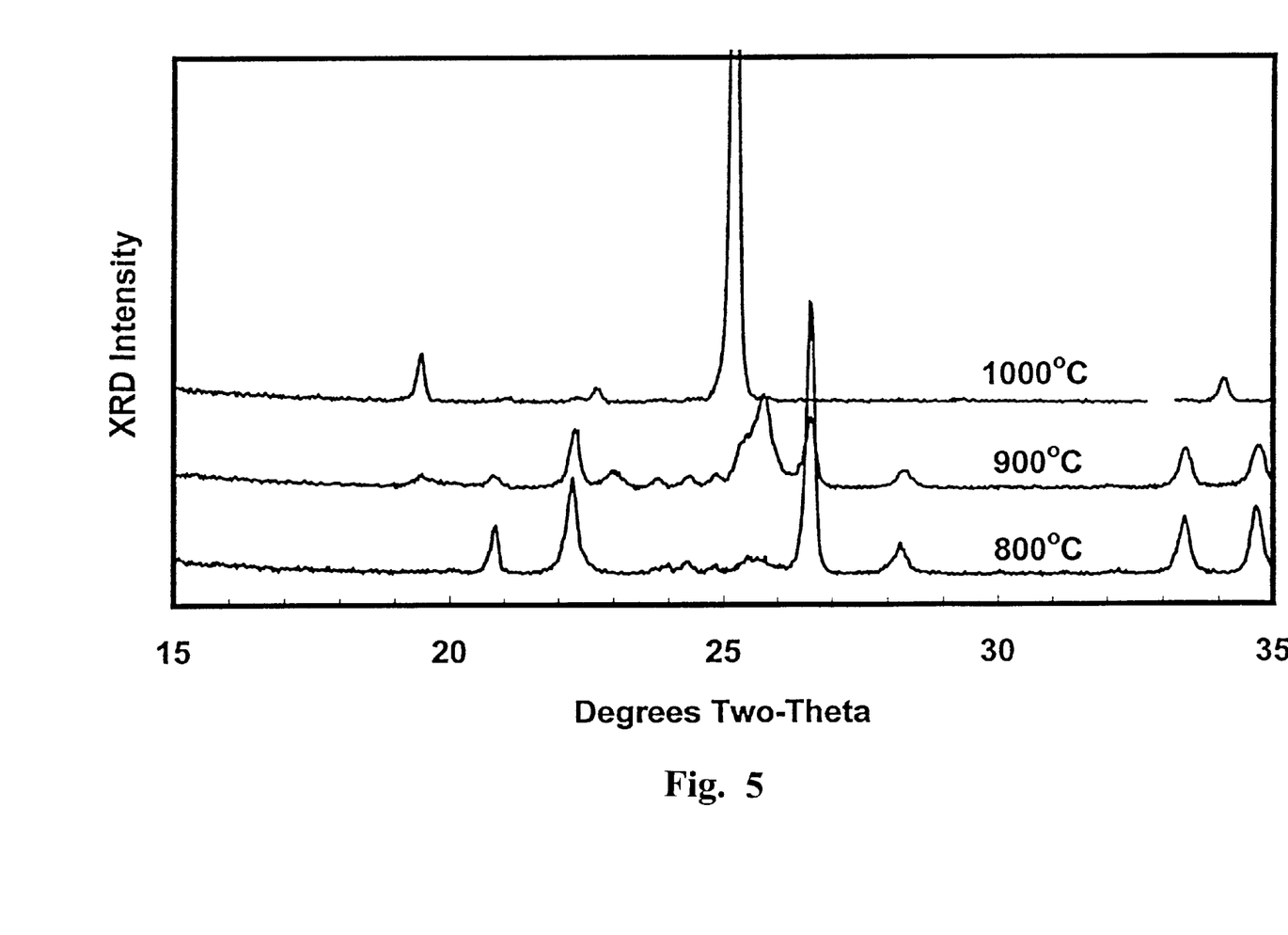
FIG. 5 is a graph of x-ray diffraction patterns of a ceramic material made in accordance with Example 9, calcined for eight hours at 800° C., 900° C., and 1000° C.
Figure 6:
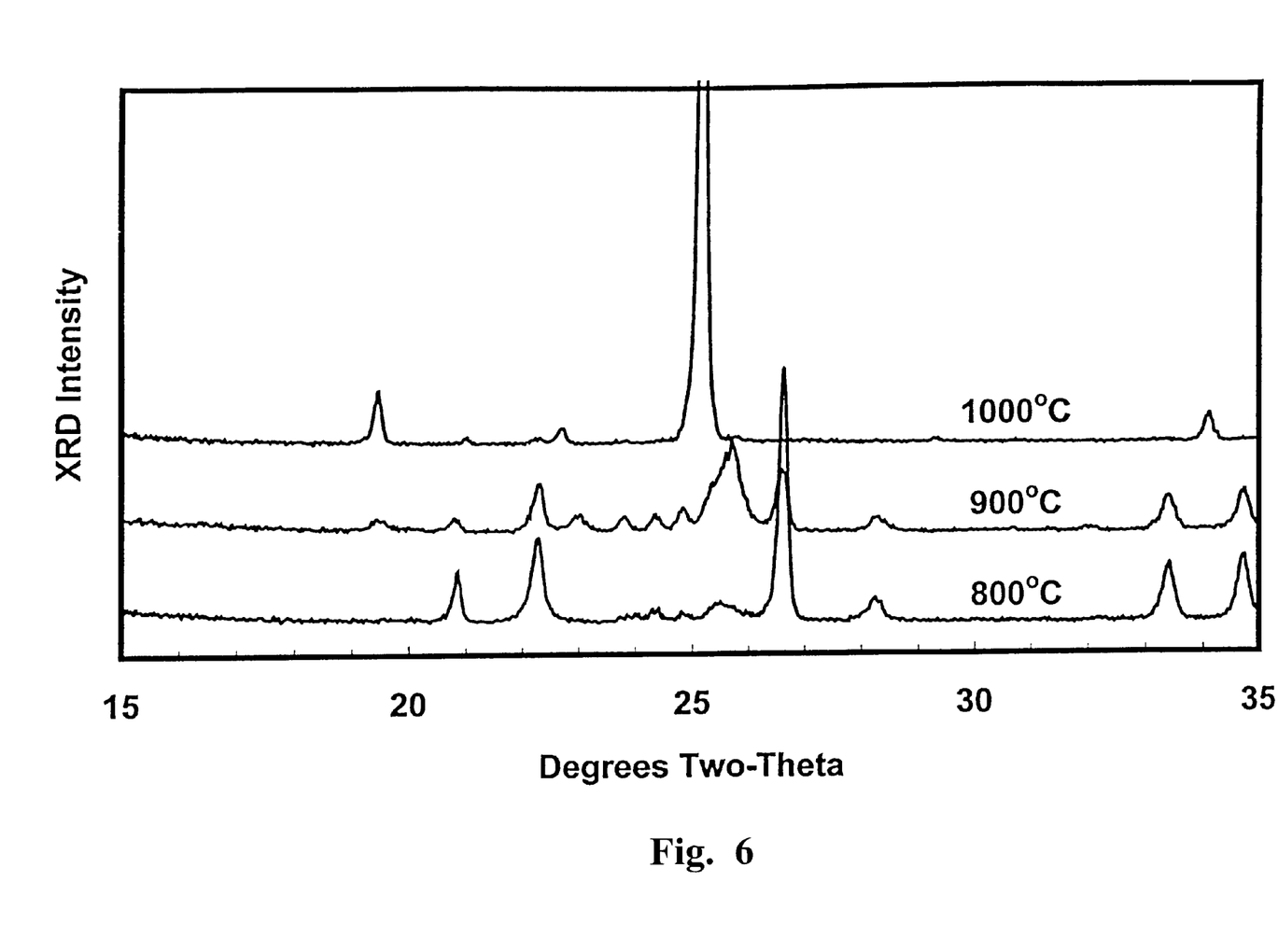
FIG. 6 is a graph of x-ray diffraction patterns of a ceramic material made in accordance with Example 11, calcined for eight hours at 800° C., 900° C., and 1000° C.
Figure 7:
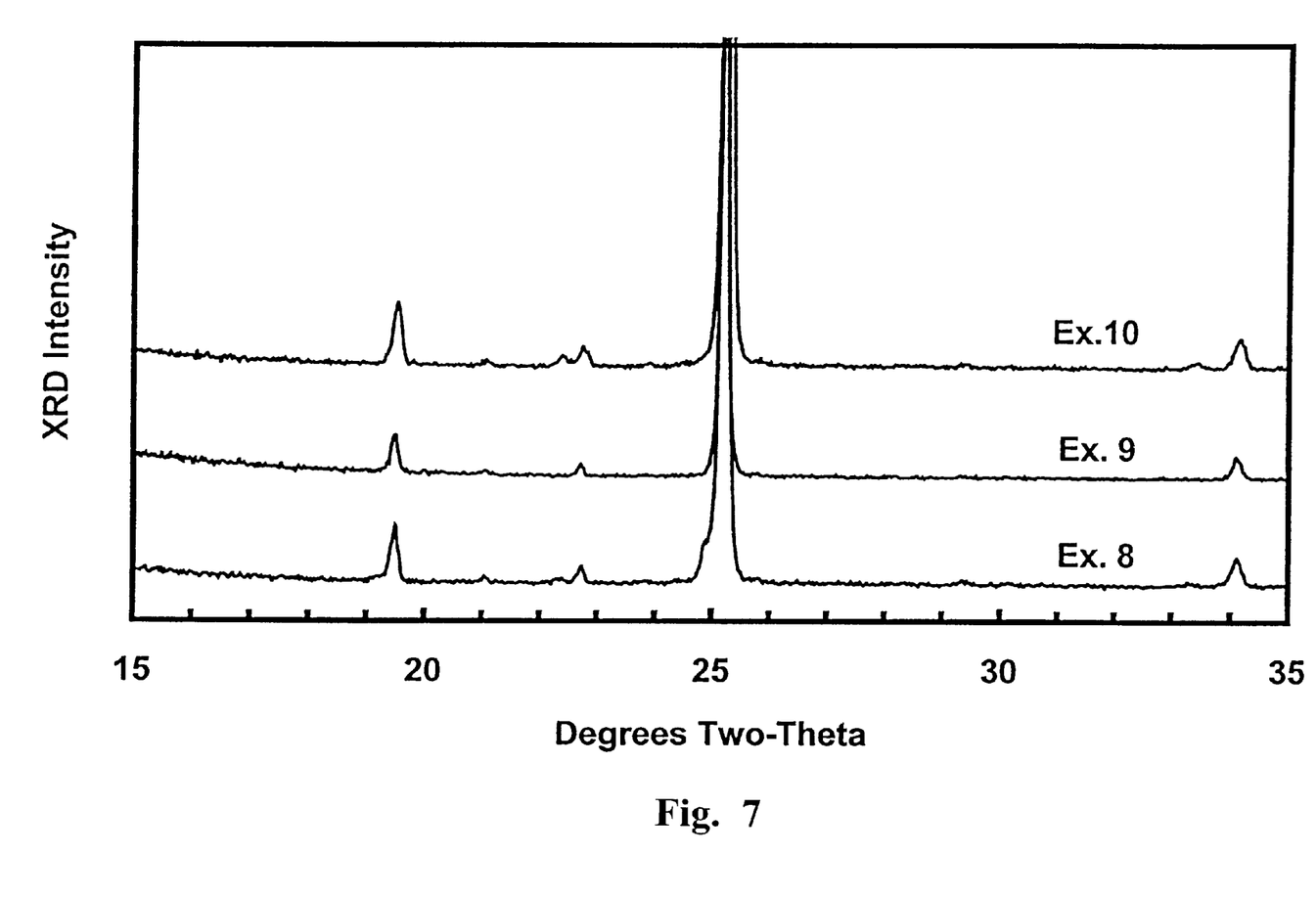
FIG. 7 is a graph of x-ray diffraction patterns of a ceramic material made in accordance with Examples 8, 9, and 10, calcined for eight hours at 1000° C.
Figure 8:
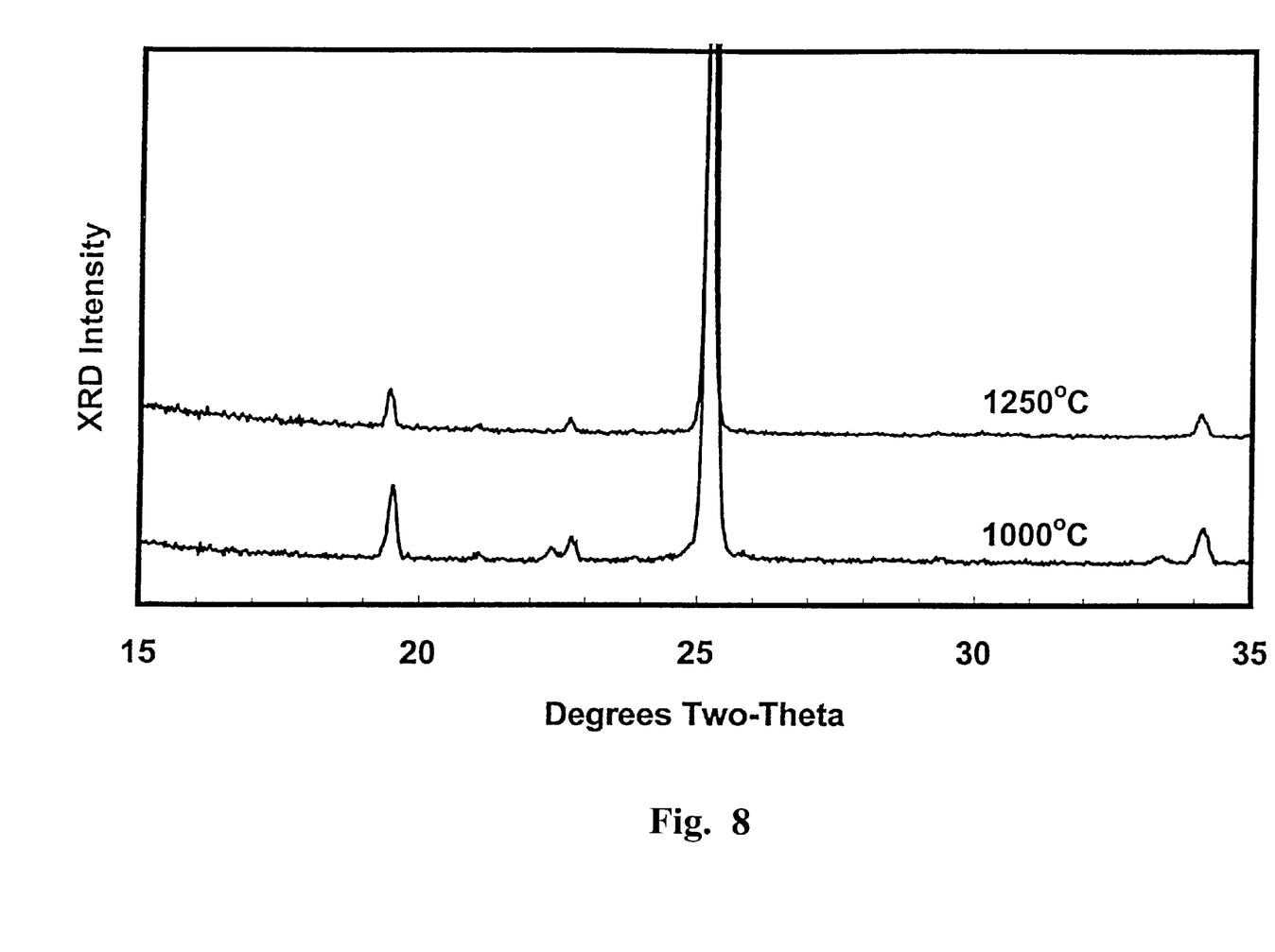
FIG. 8 is a graph of x-ray diffraction patterns of a ceramic material made in accordance with Example 10, calcined for eight hours at 1000° C., and sintered at 1250° C.

Through X-ray diffraction patterns for LAS powders of Examples 6, 9, and 11 are presented in FIGS. 4–6, respectively, which show the progression of crystalline phase formations in powders calcined at 800, 900, and 1000° C. Despite different powder processing routes used for these example LAS powders, calcination at 1000° C. always led to the desired β-eucryptite phase. At lower calcination temperatures (between about 800° C. and about 900° C.), different crystalline phases were observed, which is consistent with the known fact that the β-eucryptite phase is known to form only above 970° C. X-ray diffraction patterns are shown for LAS powders of Examples 8, 9, and 10, calcined at 1000° C. are shown in FIG. 7. With small amounts of excess lithium oxide (Examples 8 and 9), the x-ray diffraction patterns indicated single-phase β-eucryptite powders, whereas a slight impurity phase was present in the LAS powder of Example 10, which had the highest amount of excess lithium oxide. However, this impurity phase was absent in the sintered LAS ceramic of Example 10, as shown in FIG. 8. All of the example LAS powders exhibited x-ray diffraction patterns consistent with single-phase (or nearly single-phase) β-eucryptite, when calcined at about 1000° C. Sintered LAS ceramics derived from all of the example powders exhibited single-phase β-eucryptite x-ray diffraction patterns.

TABLE 4

Thermal and Mechanical Properties of LAS Ceramics

| Example | Sintering Temperature (° C.)A | Thermal Expansion (ppm/° C.) | Flexural Strength (MPA) |
|---|---|---|---|
| 1C | 1350 | −11.1 | — |
| 4B | 1200 | −8.09 | — |
| 5B | 1200 | −7.54 | — |
| 10 | 1200 | — | 35.2 |
| 12 | 1200 | −6.41 | 13.2 |
| 16 | 1200 | −5.87 | 34.0 |
| 17 | 1200 | −6.67 | 24.6 |

Thermal expansion and flexural strength data for the materials of Example 1C, 4B, 5B, 10, 12, 16 and 17 are presented in Table 4. Negative thermal expansions, in the range of −6 to −10 ppm/° C. were observed for all samples. The magnitudes of negative thermal expansion for Examples 1 C, 4B, and 5B were larger than those of Examples 12, 16, and 17, which may be the result of different measurement techniques. Within the first set of thermal expansion measurements, the LAS ceramic of Example 1C had the most negative expansion (−11.1 ppm/° C.), compared to those of LAS ceramics of Examples 4B and 5B (−8.1 and −7.5 ppm/° C., respectively). Within the second set, the least negative expansion (−5.9 ppm/° C.) was observed for the LAS ceramic of Example 16, whereas more negative expansions (−6.4 and −6.7 ppm/° C.) were observed for the LAS ceramics of Examples 12 and 17, respectively. In both sets of data, samples with lower excess lithium oxide content exhibited the most negative thermal expansion.

The primary conclusion of the biaxial flexure strength measurements is that flexural strength increased significantly as the batched amount of excess lithium oxide increased. LAS ceramics of Examples 12 and 17, with 1 mol % excess $Li_2O$ (i.e., x=0.01 in $Li_{1+x}AlSiO_{4+X/2}$) exhibited relatively low flexural strength (13.2 and 24.6 MPa, respectively). However, for LAS ceramics of Examples 10 and 17, the biaxial flexural strength increased to 34.0 and 35.2 MPa, respectively. It should be noted that the mechanical strength (modulus of rupture) of a LiASiO$_4$ ceramic, reported in the literature (reference 9), is 13.8 MPa, which is similar to that of the LAS ceramic of Example 12 (with a low excess lithium oxide content). Therefore, the increase of mechanical strength with excess lithium oxide additions provides a 2.5-fold improvement in mechanical strength of LAS ceramics.

The effect of excess Li$_2$O and powder processing methods on Young's Modulus (both flexural and torsional modes) is shows for sintered LAS ceramics of Examples 1C, 4B, and 5B in Table 5.

TABLE 5

Thermal and Mechanical Properties of LAS Ceramics

| Example | Sintering Temperature (° C.) | E (Flex) | G (Tors) |
|---|---|---|---|
| 1C | 1350 | 25.5 Gpa | 11.9 GPa |
| 4B | 1200 | 36.4 Gpa | 16.3 GPa |
| 5B | 1200 | 35.9 Gpa | 16.2 GPa |

It is again shown that LAS ceramics with higher excess Li$_2$O contents (Examples 4B and 5B) exhibited substantially higher strengths than stoichiometric LiAiSiO$_4$ ceramics (Example 1C).

The mechanical property and thermal expansion data discussed above correlate fairly well, i.e., example LAS ceramics with higher amounts of excess lithium oxide exhibited less negative thermal expansion and larger flexural strengths. It is difficult to assess how the excess lithium reduces the magnitude of negative thermal expansion, without detailed crystallographic information. However, there are several possible explanations for the observed increase in mechanical strength. One could be a reduction in residual stress that occurs during cooling from the sintering temperature. Another possibility is the formation of a liquid phase during sintering which minimizes the buildup of residual stress during cooling.

What is claimed is:

1. A ceramic material of the lithium aluminosilicate (LAS) system in which the material has a stoichiometric composition of Li$_{1+X}$AlSiO$_{4+X/2}$, where X>0.

2. A ceramic material of the lithium aluminosilicate (LAS) system having a stoichiometric composition of Li$_{1+x}$AlSiO$_{4+X/2}$, wherein the value of X is greater than 0 and is sufficient to reduce the sintering temperature at which the ceramic achieves about 95% of the theoretical density.

3. A ceramic material of the lithium aluminosilicate (LAS) system having a stoichiometric composition of Li$_{1+1}$AlSiO$_{4+X/2}$, wherein the value of X is greater than 0 and is sufficient to increase the density of the ceramic material for a given sintering temperature.

4. A ceramic material of the lithium aluminosilicate (LAS) system in which the material has a stoichiometric composition of Li$_{1+X}$AlSi$_{1+Y}$O$_{4+X/2+2Y}$, where 0<x≦0.2 for 0≦Y≦0.5.

5. The ceramic material according to claim 4 in which Y=0.

6. The ceramic material according to claim 5, where 0<X≦0.1.

7. A ceramic powder adapted to be sintered to form a ceramic material of the lithium alumino silicate (LAS) system, the powder comprising an intimate mixture of crushed spodumene or petalite and at least one material selected from the group consisting of LiAlO$_2$, Li$_2$CO$_3$, SiO$_2$, and Al$_2$O$_3$, in quantities sufficient to achieve a stoichiometric composition of the material according to claim 4.

8. The ceramic powder of claim 7, wherein the lithium alumino silicate mineral is spodumene.

9. A method of making a ceramic material of the lithium alumino silicate (LAS) system, the method comprising the steps of making an intimate mixture of crushed spodumene or petalite and at least one material selected from the group consisting of LiAlO$_2$, Li$_2$CO$_3$, SiO$_2$, and Al$_2$O$_3$, in quantities to achieve a stoichiometric composition of the material according to claim 4 and calcining the mixture.

10. The method of claim 9, wherein the lithium alumino silicate mineral is spodumene.

11. A ceramic material of the lithium aluminosilicate (LAS) system in which the material has a stoichiometric composition of Li$_{1+X}$AlSi$_{1+Y}$O$_{4+X/2+2Y}$, where 0<x≦0.2 for 0<Y≦0.5.

12. A ceramic powder adapted to be sintered to form a ceramic material of the lithium alumino silicate (LAS) system, the powder comprising an intimate mixture of a crushed lithium alumino silicate mineral and at least one material selected from the group consisting of LiAlO$_2$, Li$_2$CO$_3$, SiO$_2$, and Al$_2$O$_3$, in quantities sufficient to achieve a stoichiometric composition of the material according to claim 11.

13. A method of making a ceramic material of the lithium alumino silicate (LAS) system, the method comprising the steps of making an intimate mixture of a crushed lithium alumino silicate mineral and at least one material selected from the group consisting of LiAlO$_2$, Li$_2$CO$_3$, SiO$_2$, and Al$_2$O$_3$, in quantities to achieve a stoichiometric composition of the material according to claim 11, and calcining the mixture.

14. A ceramic powder adapted to be sintered to form a ceramic material of the lithium aluminosilicate (LAS) system, the powder comprising an intimate mixture of Li$_2$CO$_3$, SiO$_2$, and Al$_2$O$_3$, in quantities to achieve, after calcination, a stoichiometric composition of Li$_{1+X}$AlSiO$_{4+X/2}$, where 0<x≦0.2.

15. The ceramic powder according to claim 14, where 0<X≦0.1.

16. A method of making a ceramic material in the lithium aluminosilicate (LAS) system, the method comprising the steps of making an intimate mixture of Li$_2$CO$_3$, SiO$_2$, and Al$_2$O$_3$, in quantities to achieve a stoichiometric composition of Li$_{1+X}$AlSiO$_{4+X/2}$, where 0<x≦0.2, and calcining the mixture.

17. A ceramic powder adapted to be sintered to form a ceramic material of the lithium aluminosilicate (LAS) system, the powder comprising an intimate mixture of a crushed lithium aluminum silicate mineral and at least one material selected from the group consisting of LiAlO$_2$, Li$_2$CO$_3$, SiO$_2$, and Al$_2$O$_3$, in quantities to achieve a stoichiometric composition of Li$_{1+X}$AlSiO$_{4+X/2}$, where 0≦X≦0.2.

18. The ceramic powder according to claim 14 wherein X>0.

19. The ceramic powder according to claim 17 wherein the lithium aluminum silicate mineral is spodumene.

20. The ceramic powder according to claim 17 wherein the lithium aluminum silicate mineral is petalite.

21. A method of making a ceramic material of the lithium aluminosilicate (LAS) system, the method comprising the steps of making an intimate mixture of a crushed lithium aluminum silicate mineral and at least one material selected from the group consisting of $LiAlO_2$, $Li_2CO_3$, $SiO_2$, and $Al_2O_3$, in quantities to achieve a stoichiometric composition of $Li_{1+X}AlSiO_{4+X/2}$, where $0 \leq X \leq 0.1$, and calcining the mixture.

22. The method according to claim 21 wherein X>0.

23. The method according to claim 21 wherein the lithium aluminum silicate mineral is spodumene.

24. The method according to claim 21 wherein the lithium aluminum silicate mineral is petalite.

25. A ceramic powder adapted for sintering for forming ceramic materials of the lithium aluminosilicate (LAS) system, the powder comprising an intimate mixture of $LiAlSi_2O_6$ and $Li_2CO_3$, $SiO_2$, and $Al_2O_3$ in quantities to achieve a stoichiometric composition of $Li_{1+X}AlSiO_{4+X/2}$, where $0 \leq X \leq 0.1$, and calcining the mixture.

26. A method of making a ceramic material of the lithium aluminosilicate (LAS) system, the method comprising the steps of making a mixture having a stoichiometric composition of $Li_{1+X}AlSiO_{4+X/2}$, where $0<X \leq 0.1$; calcining the mixture; and sintering the mixture at a temperature of less than about 1200° C.

27. A method of making a ceramic material of the lithium alumino silicate (LAS) system, the method comprising the steps of making a mixture having a stoichiometric composition of $Li_{1+X}AlSi_{1+Y}O_{4+X/2+2Y}$, where $0<Y \leq 0.1$ and $0 \leq Y \leq 0.5$; calcining the mixture; and sintering the mixture at a temperature of less than about 1250° C.

* * * * *